United States Patent [19]

Hensley

[11] Patent Number: 5,417,462
[45] Date of Patent: May 23, 1995

[54] LAWN NET FOR CAPTURING AND RETAINING LAWN DEBRIS

[76] Inventor: Connie M. Hensley, Rte. 1 Box 118D, Trezevant, Tenn. 38258

[21] Appl. No.: 95,334

[22] Filed: Jul. 22, 1993

[51] Int. Cl.⁶ .......................... B65D 63/00; B65F 1/14
[52] U.S. Cl. ......................................... 294/1.1; 56/329; 141/391; 383/4; 383/75
[58] Field of Search .................... 294/1.1, 74, 77, 141, 294/149, 150, 156; 15/257.1; 47/1.01, 48.5; 53/390; 56/329; 141/391; 239/34, 57, 289; 383/4, 6, 75

[56] References Cited

U.S. PATENT DOCUMENTS

| | | | |
|---|---|---|---|
| 2,766,797 | 10/1956 | Cowen | 294/1.1 X |
| 2,974,971 | 3/1961 | Buck | 294/1.1 X |
| 3,804,330 | 4/1974 | Miller et al. | 239/34 |
| 4,130,245 | 12/1978 | Bryson | 239/34 |
| 4,366,949 | 1/1983 | Staub | 56/329 X |
| 4,602,664 | 7/1986 | Hullen | 294/1.1 X |
| 4,738,477 | 4/1988 | Grossmeyer | 294/1.1 |
| 4,955,068 | 9/1990 | Tennihan | 294/1.1 X |
| 5,066,143 | 11/1991 | Sanders | 383/4 |

Primary Examiner—Johnny D. Cherry

[57] ABSTRACT

A net which may be positioned upon a lawn for collecting leaves thereon without harming the lawn. The device includes a netting material which may be left on the lawn for an extended period of time while leaves fall onto the net from surrounding trees. The net may be gathered together to enclose the leaves by a use of a cord disposed along a periphery of the netting material. The net further includes a dispensing assembly for applying insecticide or fertilizer compounds to the lawn and is also provided with an adhesive applicator for applying an adhesive to the netting material prior to its placement upon the lawn.

2 Claims, 4 Drawing Sheets

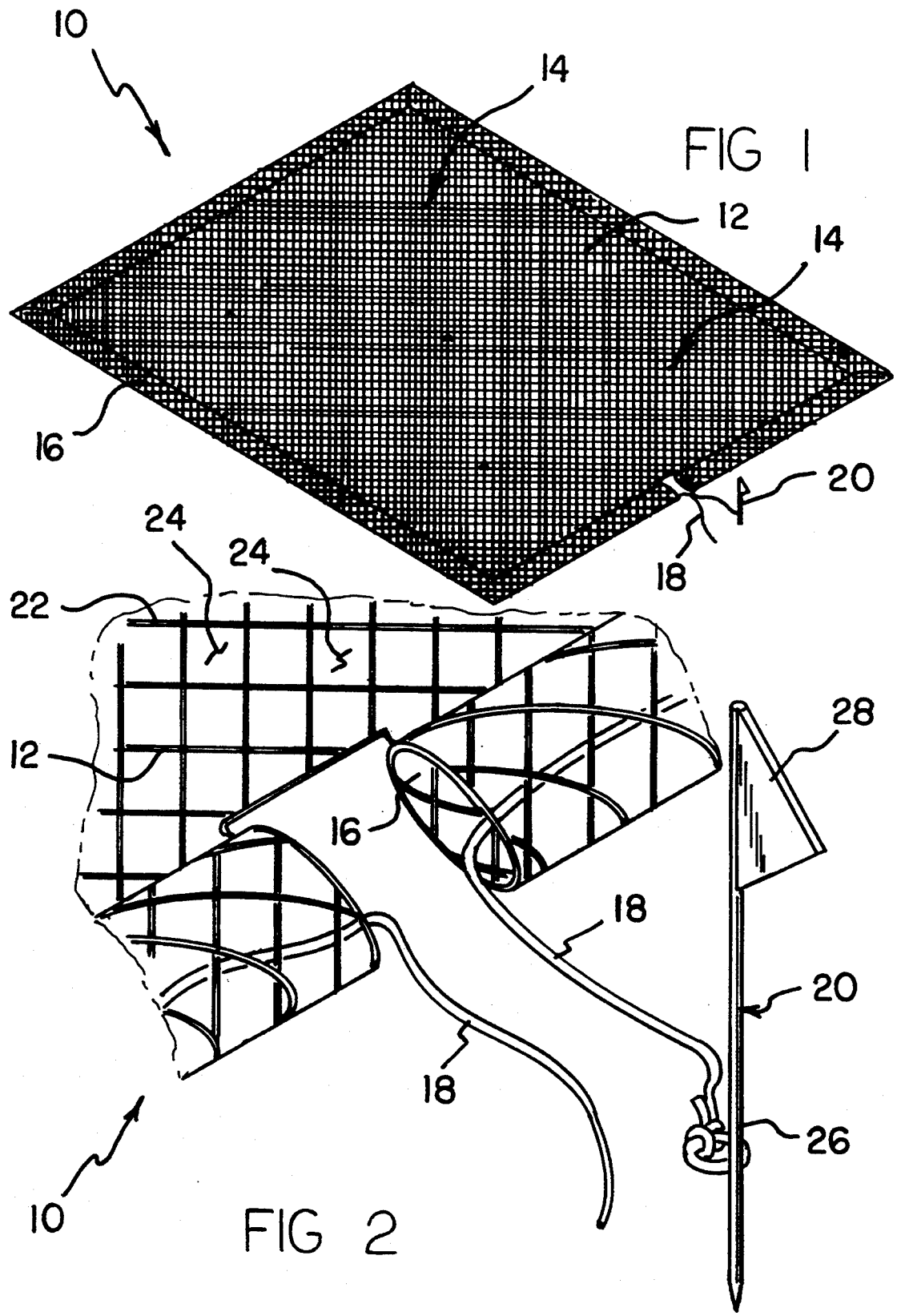

LAWN NET FOR CAPTURING AND RETAINING LAWN DEBRIS

BACKGROUND OF THE INVENTION

1. Field of the Invention

The present invention relates to leaf collecting apparatuses and more particularly pertains to lawn nets which may be positioned upon a lawn for collecting leaves over a period of time.

2. Description of the Prior Art

The use of leaf collecting apparatuses is known in the prior art. More specifically, leaf collecting apparatuses heretofore devised and utilized for the purpose of collecting leaves are known to consist basically of familiar, expected and obvious structural configurations, notwithstanding the myriad of designs encompassed by the crowded prior art which have been developed for the fulfillment of countless objectives and requirements.

For example, a debris collecting and bagging apparatus is illustrated in U.S. Pat. No. 5,031,277 which is constructed of a rigid frame having an opening that is completely surrounded with a supply of netting material that forms a netting bag. When the bag is filled to the desired capacity, the netting material is cut and tied at the open end to form a completely enclosed bag of refuse. A new netting bag may be formed from the supply of netting surrounding the rigid frame and the process repeated.

A lawn and leaf bag frame is disclosed in U.S. Pat. No. 4,846,427 which includes a U-shaped back frame, wheels attached to and extending behind the back frame, and a bag supporting platform pivotally connected to a lower end portion of the back frame which is tiltable upwardly from an extended position perpendicular to the back frame to a storage position in-line with the back frame. The cart also includes a pair of arms pivotally connected to the back frame which permit the bag supporting frame with a bag attached to be easily loaded upon and unloaded from the cart by sliding the bag supporting frame onto and off of the arms.

Another patent of interest is U.S. Pat. No. 4,299,365 which discloses a leaf bag spreader and holder. The device comprises an improved spreader for leaf bags which not only is collapsible for compact packaging and storage but is provided with ground engaging skids to permit the same to be dragged along a ground surface while simultaneously maintaining the mouth of a bag above the ground to prevent the bag from engaging the ground surface during the dragging operation.

While these devices fulfil their respective, particular objectives and requirements, the aforementioned patents do not describe a net which may be positioned upon a lawn for collecting leaves over a period of time without harming the lawn. Furthermore, none of the prior art leaf collecting apparatuses include a dispensing assembly for applying insecticide or fertilizer compounds to the lawn, nor do they include an adhesive applicator for supplying an adhesive to at least a portion of the netting material.

In these respects, the lawn net according to the present invention substantially departs from the conventional concepts and designs of the prior art, and in so doing provides an apparatus primarily developed for the purpose of collecting leaves from a lawn.

SUMMARY OF THE INVENTION

In view of the foregoing disadvantages inherent in the known types of leaf collecting apparatuses now present in the prior art, the present invention provides a new lawn net construction wherein the same can be positioned upon a lawn for collecting leaves over a period of time without harming the lawn. As such, the general purpose of the present invention, which will be described subsequently in greater detail, is to provide a new lawn net apparatus which has many of the advantages of the leaf collecting apparatuses mentioned heretofore and many novel features that result in a lawn net which is not anticipated, rendered obvious, suggested, or even implied by any of the prior art leaf collecting apparatuses, either alone or in any combination thereof.

To attain this, the present invention essentially comprises a lawn net which may be positioned upon a lawn for collecting leaves thereon without harming the lawn. The net includes a netting material which may be left on the lawn for an extended period of time while leaves fall onto the net from surrounding trees. The net may be gathered together to enclose the leaves by a use of a cord disposed along a periphery of the netting material. The net further includes a dispensing assembly for applying insecticide or fertilizer compounds to the lawn and is provided with an adhesive applicator for applying an adhesive to the netting material.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lawn net apparatus which has many of the advantages of the leaf collecting apparatuses mentioned heretofore and many novel features that result in a lawn net which is not anticipated, rendered obvious, suggested, or even implied by any of the prior art leaf collecting apparatuses, either alone or in any combination thereof.

It is another object of the present invention to provide a new lawn net which may be easily and efficiently manufactured and marketed.

It is a further object of the present invention to provide a new lawn net which is of a durable and reliable construction.

An even further object of the present invention is to provide a new lawn net which is susceptible of a low cost of manufacture with regard to both materials and labor, and which accordingly is then susceptible of low prices of sale to the consuming public, thereby making such lawn nets economically available to the buying public.

Still yet another object of the present invention is to provide a new lawn net which provides in the apparatuses and methods of the prior art some of the advantages thereof, while simultaneously overcoming some of the disadvantages normally associated therewith.

Still another object of the present invention is to provide a new lawn net which may be positioned upon a lawn for collecting leaves thereon without harming the lawn.

Yet another object of the present invention is to provide a new lawn net which may be gathered together to enclose leaves by a use of a cord disposed along a periphery of the netting material.

Even still another object of the present invention is to provide a new lawn net which includes a dispensing assembly for applying insecticide or fertilizer compounds to a lawn.

Even still yet another object of the present invention is to provide a new lawn net which includes an adhesive applicator for applying an adhesive to at least a portion of the netting material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a lawn net comprising the present invention.

FIG. 2 is an enlarged perspective view of a portion of the present invention.

DESCRIPTION OF THE PREFERRED EMBODIMENT

Figure 3:
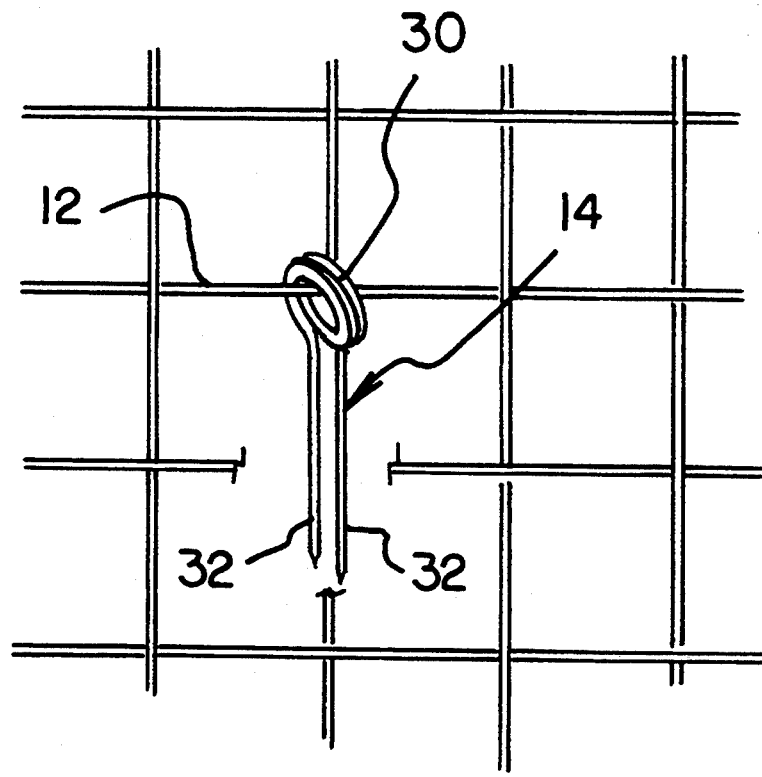
FIG. 3 is an enlarged top plan view of a portion of the invention including a perspective view of a further portion of the invention.

With reference now to the drawings, and in particular to FIGS. 1-4 thereof, a new lawn net embodying the principles and concepts of the present invention and generally designated by the reference numeral 10 will be described.

The lawn net 10 comprises a netting material 12 which may be positioned upon a ground surface and secured thereto for a period of time without interfering with or precluding a growth of a lawn therebeneath. The netting material 12 includes a plurality of anchors 14 coupled thereto which serve to prevent the netting material from being moved or blown away as a result of wind currents. The anchors 14 are operable to capture a portion of the netting material 12 and engage the ground surface by piercing the same. A cord guide 16 is formed around a peripheral area of the netting material 12 and slidably encapsulates a cord 18. A marker 20 is coupled to a portion of the cord 18 to facilitate an identification of the cord through leaves and other debris.

In use, the lawn net 10 may be positioned upon a lawn, whereby leaves and other debris may collect thereon. The cord 18 may then be pulled through the cord guide 16 to cause a bundling of the netting material 12 around the leaves and debris positioned upon the netting material. The lawn net 10 may be constructed of a reusable netting material or, alternatively, may be constructed of a disposable netting material whereby the lawn net and the captured leaves and debris may simply be disposed of.

More specifically, it will be noted that the lawn net 10 comprises an area of netting material 12 which may be positioned upon a ground surface and secured thereto without interfering with or precluding a growth of a lawn therebeneath. The netting material 12 is comprised of a plurality of threads 22 which are orthogonally coupled together to form a plurality of substantially identical apertures 24 therethrough, as best illustrated in FIG. 2. The apertures 24 are of a size which precludes a passing of leaves and other debris therethrough, but they are large enough to allow a healthy growth of the lawn present below the netting material 12. In the preferred embodiment the apertures are ¾ of an inch by ¾ of an inch square. The plurality of threads 22 may be constructed of any material useful for forming the netting material 12 and are preferably made from a nylon or plastic material. Furthermore, the netting material 12 may be comprised of a disposable or recyclable material which facilitates a single use of the lawn net 10.

Around a periphery of the lawn net 10, the netting material 12 is folded upon and secured to itself to form a cord guide 16 through which a cord 18 passes. The cord 18 is operable to be pulled through the cord guide 16 by a user so as to cause a bunching up of the netting material 12 around leaves and other debris present thereon, thereby capturing the same within the lawn net 10. A marker 20 is coupled to the cord 18 and is operable to identify the cord through leaves and other debris. The marker 20 is comprised of a post 26 which may be inserted into the ground in a well understood manner. A flag 28 is coupled to the post 26 and may be constructed of any substantially bright colored material which facilitates an easy identification thereof.

Figure 4:
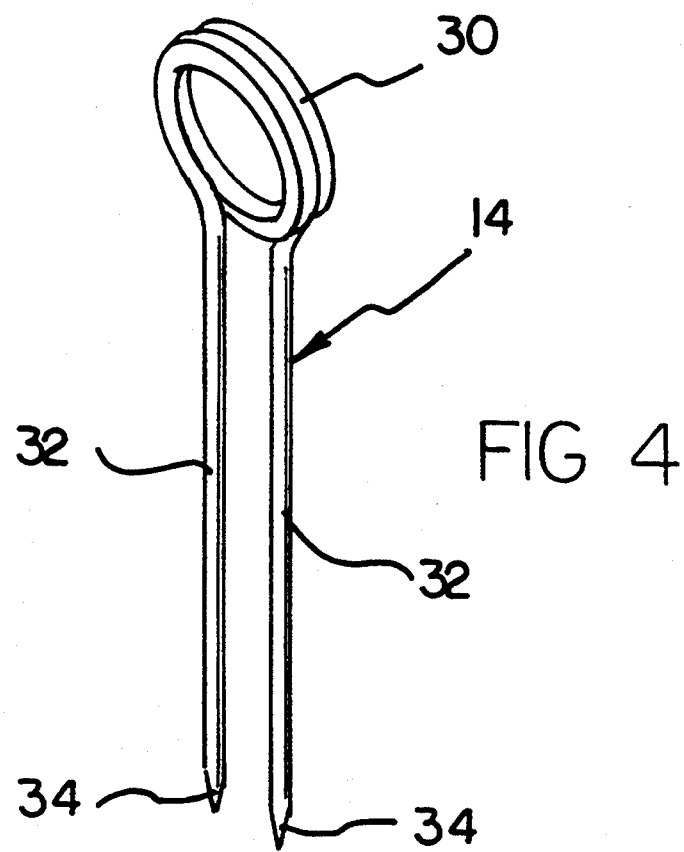
FIG. 4 is a perspective view of the further portion of the invention.

The anchors 14 are secured to the netting material 12 and may be utilized for securing the lawn net 10 to a ground surface. The anchors are all substantially similar and therefore only one will be described in detail. As best shown in FIGS. 3-4, each of the anchors 14 comprises a plurality of loops 30 which are formed from a strand of wire and which terminate with a pair of legs 32 that project away therefrom in a substantially parallel relationship. The legs 32 each include a sharpened point 34 which facilitates a piercing of the ground surface so that the anchor may be inserted thereinto, as shown in FIG. 4.

Figure 5:
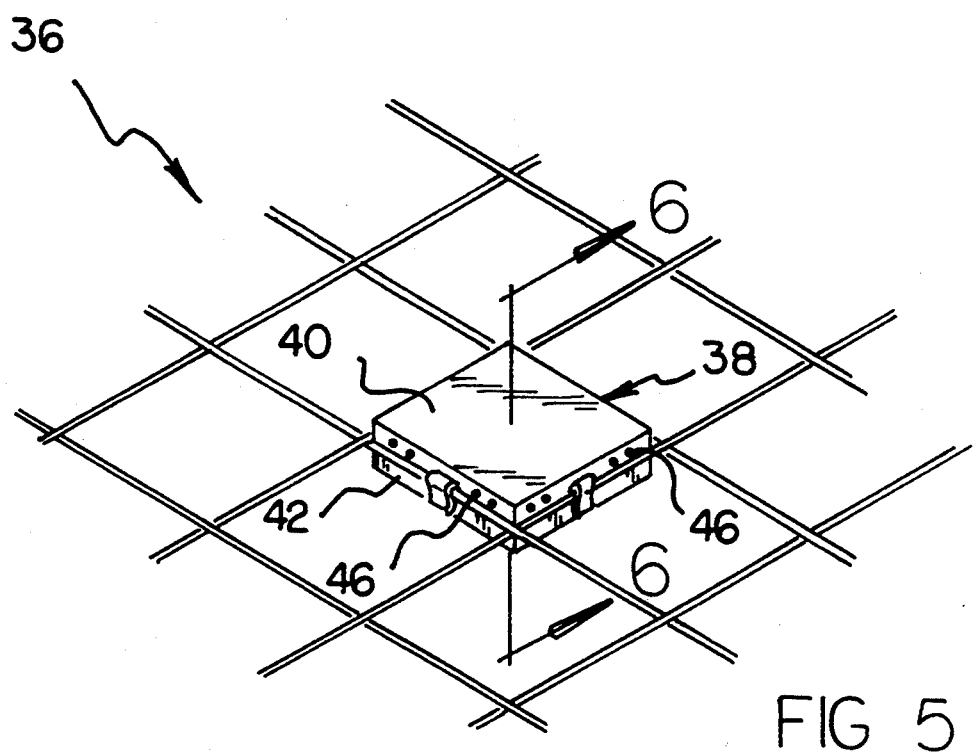
FIG. 5 is a perspective view of a portion of a second embodiment of a lawn net comprising the present invention.
Figure 6:
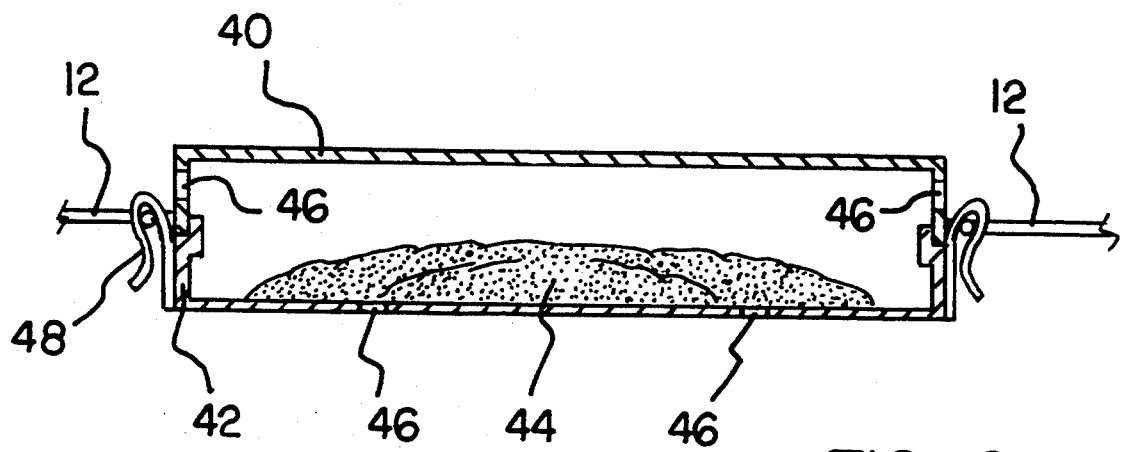
FIG. 6 is a cross sectional view taken along line 6—6 of FIG. 5.

A second embodiment of the present invention as generally designated by the reference numeral 36, which comprises substantially all of the features of the foregoing embodiment 10 and which further comprises at least one and preferably more dispensing assemblies 38 will be described. As best shown in FIGS. 5-6, it can be shown that the dispensing assemblies 38 each comprise a container cap 40 removably coupled to a container base 42. The container base 42 is operable to support a predetermined amount of a treatment compound 44, such as an insecticide or a fertilizer, therein, as best illustrated in FIG. 6. The container cap 40 encloses the treatment compound 44 and includes a plurality of dispensing holes 46 through which the treatment compound may be dispensed into the lawn.

The container base 42, and its associated container cap 40, are sized so as to fit snugly within the apertures 24 of the netting material 12 and may be removably coupled to the netting material by a plurality of clips 48 engagable thereto. The dispensing assemblies 38 may be selectively positioned in various locations throughout the netting material 12 to dispense the treatment compound 44 into the lawn at desired locations.

Figure 7:
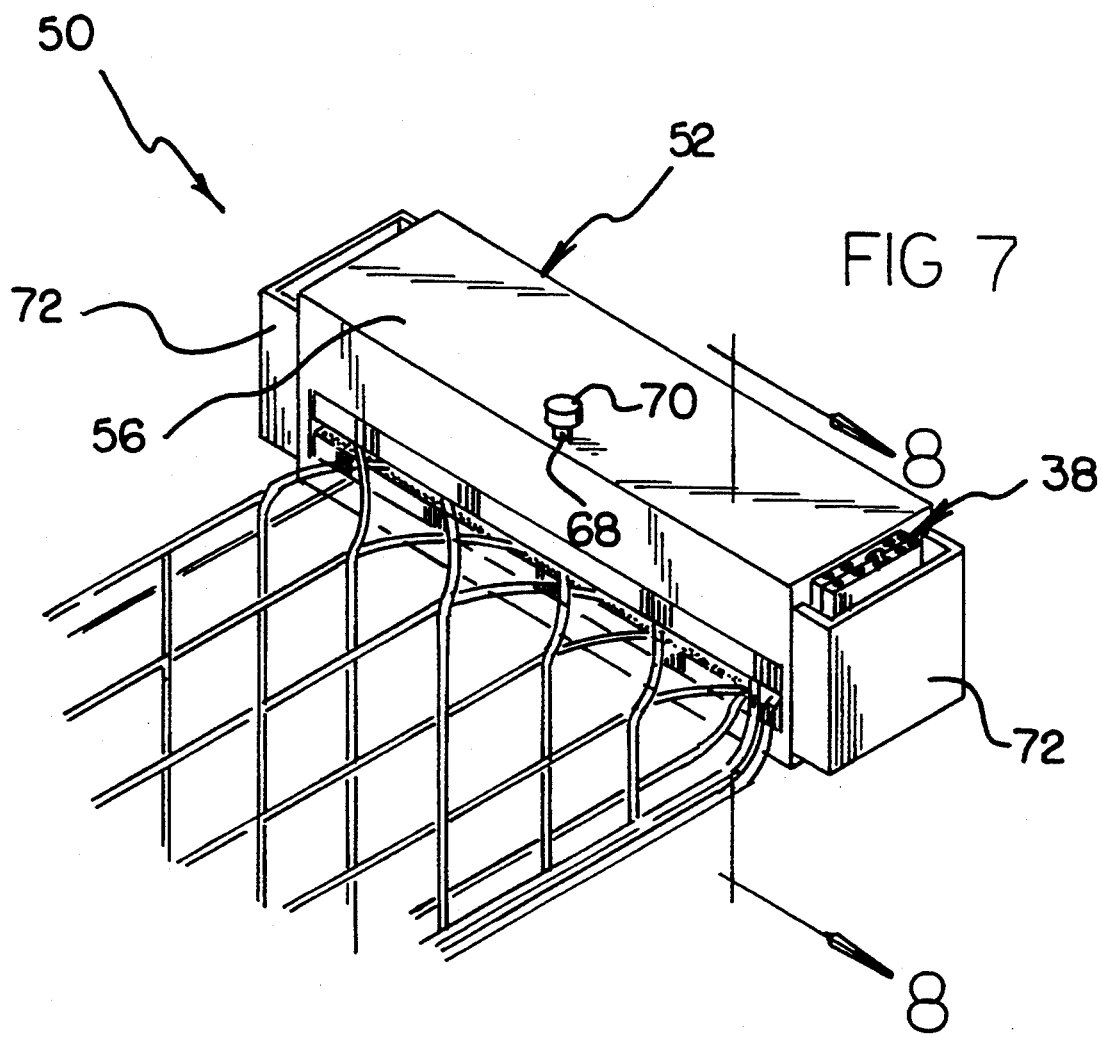
FIG. 7 is a perspective view of a third embodiment of a lawn net comprising the present invention.
Figure 8:
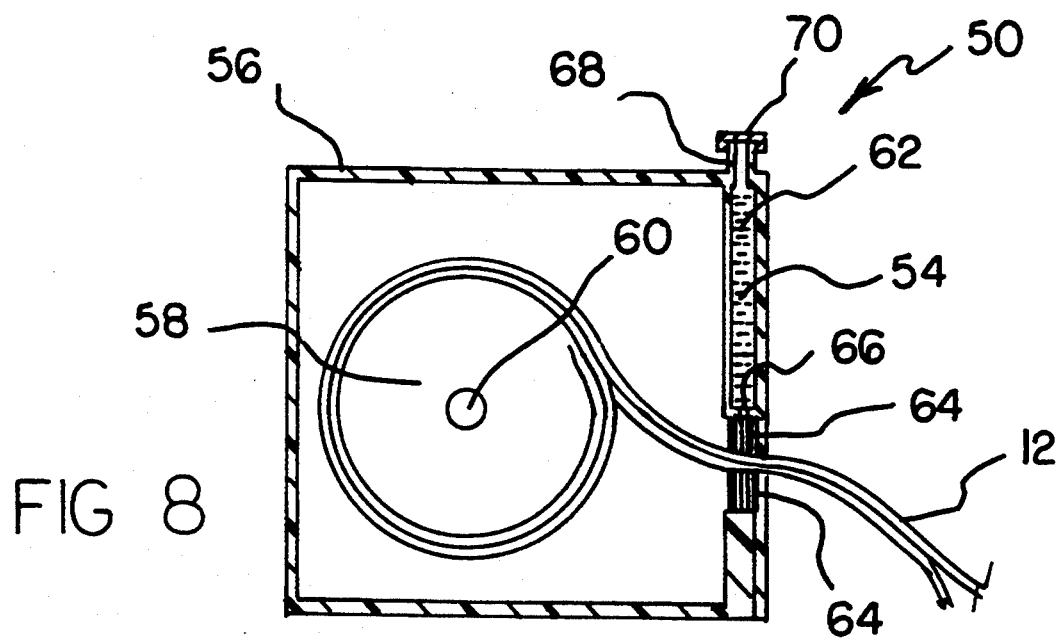
FIG. 8 is a cross sectional view taken along line 8—8 of FIG. 7.

Comprising all the features and structure of the previous embodiments 10, 36 is a third embodiment which is generally designated by the reference numeral 50 and may be viewed in FIGS. 7-8. It can be shown that the third embodiment 50 further comprises an adhesive applicator 52 which is operable to apply a liquid adhesive 54 to the netting material 12. The adhesive applicator 52 comprises a substantially rectangularly shaped container 56 inside of which a cylindrical roller 58 is supported upon an axle 60, as best illustrated in FIG. 8. The cylindrical roller 58 is operable to support a supply of the netting material 12 comprising the lawn net 10, 36, and 50. As the netting material 12 is removed from the container 56 the liquid adhesive 54 is applied thereto from an adhesive compartment 62 by a plurality of brushes 64. The adhesive compartment 62 is integrally or otherwise formed into a front area of the container 56 and includes an adhesive compartment aperture 66 that facilitates fluid communication between the adhesive compartment and the plurality of brushes 64. The adhesive compartment 62 further includes a fill tube 68 and a cap 70 engagable to the same. Furthermore, a plurality of pockets 72 are fixedly secured to respectively opposed exterior side surfaces of the container 56 and are operable to removably contain a plurality of the dispensing assemblies 38 for storage purposes.

In use, the adhesive applicator 52 applies a coating of the liquid adhesive 54 to the netting material 12 so that leaves and other debris will not be blown away or moved by the wind. Although the adhesive applicator 52 may be utilized for either disposable or reusable compositions of the netting material 12, it is particularly suited for the disposable variety.

As to further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn net comprising:
   a netting material having a periphery and defining a plurality of apertures therethrough;
   a cord guide formed around said periphery of said netting material;
   a cord disposed within said cord guide and extending around said periphery of said netting material;
   at least one anchor means coupled to said netting material for securing the same to a ground surface, said at least one anchor means comprising at least one loop formed from a strand of wire, said loop terminating with a pair of substantially parallel legs operable to be inserted into a ground surface, wherein a portion of said netting material is removably captured by said at least one loop; and;
   a marker means coupled to said cord for identifying a portion thereof, said marker means comprising a post coupled to said cord, and a flag coupled to said post.

2. The lawn net of claim 1, and further comprising an adhesive applicator means for applying an adhesive to said netting material, said adhesive applicator means comprising a container shaped so as to define an adhesive compartment; an adhesive positioned within said adhesive compartment; a cylindrical roller rotatably mounted within said container, said netting material being rolled about said roller; and a plurality of brushes in fluid communication with said adhesive compartment and extending into contact with said netting material for applying said adhesive to said netting material.

* * * * *